United States Patent
Op Den Camp

(10) Patent No.: US 7,406,894 B2
(45) Date of Patent: Aug. 5, 2008

(54) STEERING COLUMN ASSEMBLY

(75) Inventor: Eckart Op Den Camp, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/241,731

(22) Filed: Sep. 30, 2005

(65) Prior Publication Data

US 2006/0156856 A1 Jul. 20, 2006

(51) Int. Cl.
*B62D 1/19* (2006.01)
(52) U.S. Cl. .................... 74/493; 280/775; 280/777
(58) Field of Classification Search ............. 74/493, 74/492; 280/775, 777
See application file for complete search history.

(56) References Cited

U.S. PATENT DOCUMENTS

| 5,988,679 | A | 11/1999 | Schelling et al. | |
| 6,290,258 | B1 | 9/2001 | Parkinson et al. | |
| 6,886,859 | B2 * | 5/2005 | Braun et al. | 280/775 |
| 2002/0178857 | A1 * | 12/2002 | Matsumiya | 280/775 |

FOREIGN PATENT DOCUMENTS

| DE | 196 43 203 A1 | 4/1998 |
| DE | 100 25 979 A1 | 12/2000 |
| EP | 1 057 712 | * 12/2000 |
| JP | 2002284017 | 10/2002 |

OTHER PUBLICATIONS

Anonymous: "Computer controlled energy absorbing steering column for automotive use"; Research Disclosure, Kenneth Mason Publications, Hampshire, GB, vol. 359, No. 47, Mar. 1994, XP007119660, ISSN: 0374-4353, the whole document.

* cited by examiner

Primary Examiner—William C Joyce
(74) Attorney, Agent, or Firm—MacMillan, Sobanski & Todd, LLC

(57) ABSTRACT

A steering column assembly comprising a steering column shroud which supports a steering column shaft, the shroud being connected to the vehicle by a clamping mechanism which is operable between a locked position in which the shroud is clamped in position relative to a fixed portion of the vehicle chassis and an unlocked position in which the shroud is adjustable for reach and/or rake relative to the vehicle chassis. The clamping mechanism includes an actuator and a user operated switch that is connected to the actuator and which is operable to control the operation of the actuator to move the clamp between the locked and the unlocked position.

17 Claims, 4 Drawing Sheets

STEERING COLUMN ASSEMBLY

CROSS-REFERENCE TO RELATED APPLICATIONS

This application claims priority to application Ser.No. PCT/IB2004/001263 filed Mar. 19, 2004, the disclosures of which are incorporated herein by reference in entirety, which claims priority to Great Britain Application No. 0307468.9 filed Apr. 1, 2003, the disclosures of which are incorporated herein by reference in entirety.

BACKGROUND OF THE INVENTION

This invention relates to improvements in steering column assemblies, especially but not exclusively to electric power assisted steering assemblies.

It is known to provide a steering column assembly in which a steering wheel is connected to one or more road wheels through a collapsible or telescopic steering column shaft. The shaft is designed to collapse away from a driver of the vehicle if a load is applied to the steering wheel in the event of an accident. The shaft may comprise a single part shaft which has a weakened central section that will concertina under an axial load. Alternatively it may comprise a two part telescopic shaft in which one part slides axially into the other under an axial load.

To locate the steering shaft relative to the vehicle it is typically supported within one or more bearings carried by a steering column shroud. The shroud is in turn fixed to a part of the vehicle chassis or bulkhead. In the case of a collapsible steering column at least a portion of the shroud must also be capable of collapsing as a load is applied.

In almost all vehicle produced today the column shroud is clamped to a fixed portion of the vehicle in a way that permits the steering shaft to be adjusted for rake and optionally for reach. A lever-which must be located within easy reach of the driver-allows a clamping mechanism to be locked and unlocked to for the position of the steering column shroud to be adjusted. This enables the driver of the vehicle to set the steering wheel at the most comfortable position.

BRIEF SUMMARY OF THE INVENTION

In accordance with a first aspect the invention provides a steering column assembly comprising a steering column shroud which supports a steering column shaft, the shroud being connected to the vehicle by a clamping mechanism which is operable between a locked position in which the shroud is clamped in position relative to a fixed portion of the vehicle chassis and an unlocked position in which the shroud is adjustable for reach and/or rake relative to the vehicle chassis, the clamping mechanism including an actuator and a user operated switch which is connected to the actuator and which is operable to control the operation of the actuator to move the clamp between the locked and the unlocked position.

As the loads on the steering column can be high in the event of a crash the clamp and the lever that allows it to be opened and closed must be quite robust and this often makes it a relatively large device. The location of the lever can in some cases present a hazard to the driver as it may be struck by the drivers legs causing possible injury. Providing an actuator and a switch removes the requirement for a lever and so reduces the level of risk to the driver. The designer has greater freedom over the location of the switch which can be moved to a more convenient position than a lever.

The switch may comprise a one touch or toggle switch. It may be operable by a user between a locked and an unlocked position corresponding to a locked and an unlocked position of the clamping mechanism respectively. The actuator may comprise an electric motor in one arrangement, a servo motor being preferred. On operation of the switch from locked to the unlocked position a drive current is applied to the motor to drive it in a first direction to move the clamp to the unlocked position and on operation of the switch from the unlocked to the locked position the motor a drive current is applied to the motor so that it is driven in a second, opposite direction to move the clamp to the unlocked position. The motor may operate until a stall current is reached whereupon it may be assumed that the clamp is fully locked or unlocked.

By clamping the assembly in the locked position we may mean pulling or pushing at least a part of the assembly into engagement with a fixed portion of the vehicle, or perhaps altering the geometry of a portion of the assembly to clamp it to the fixed portion.

The clamp may comprise a pin which carries a clamping head assembly, the pin being connected to the actuator through one or more gears and which may be driven axially upon operation of the actuator, the pin passing through an opening in a bracket fixed to the vehicle and an opening in the shroud with the head being on the opposite side of the shroud to the bracket such that operation of the actuator to the locked position draws the clamping head assembly towards the shroud and clamps the shroud to the bracket. Similarly, operation of the actuator from the locked to the unlocked position moves the head away from the shroud to unclamp it from the bracket.

The pin may be threaded, perhaps with a fast thread which may be of constant gradient and may carry a nut having a complimentary thread which is rotated by the actuator to produce an axial movement of the pin. The actuator may drive one or more gears which may be reduction gears. Alternatively or additionally the actuator may rotate a cam relative to a cam follower or vice versa.

Most preferably the actuator and the gearset may be provided in a self contained unit or housing which is secured to the rest of the steering column assembly. A manual override may be provided which permits the mechanism to be locked or unlocked in the event of a malfunction such as a failure of the actuator or a loss of power to the actuator. The switch may secured to the housing.

The opening in the fixed portion, typically a pressed or cast metal bracket, may comprise an elongate slot which is parallel to the axis of the steering shaft and orthogonal to the axis of the pin to allow the pin to move in the slot for adjustment of the shroud (and hence steering shaft) for reach. Teeth may be provided on the shroud which co-operate with corresponding teeth on the bracket.

Alternatively, the opening in the fixed portion or bracket may comprise an elongate slot which is orthogonal to the axis of the steering shaft and the axis of the pin to permit adjustment of the shroud from rake.

In the later case, the shroud assembly may also include a guide post which co-operates with the shroud such that the shroud permits the post to slide axially relative to the shroud in a direction parallel to the axis of the steering shaft, the guide post providing location of the steering shaft. The shaft may be located in one or more bearings supported by the guide post. The pin may pass through an elongate opening in the guide post such that the head of the pin is on the opposite side of the opening to the shroud, the elongate slot permitting adjustment of the guide post (and hence steering shaft) for reach.

The head of the pin may be provided one or more tracks of teeth which engage corresponding teeth on the guide post when in the locked position. Alternatively, a toothed member may be provided between the head and the guide post which has one or more tracks of teeth that engage corresponding sets of teeth on the shroud. This prevents unwanted movement of the guide post relative to the shroud when the clamping mechanism is locked.

The position of the steering column may be by manual adjustment when in the unlocked position. By this we mean that the position of the steering wheel is altered by applying a physical force onto the wheel by a driver. It is envisaged that the movement will be achieved by a driver pushing or pulling the steering wheel away from/towards them and/or up/down. This is considerably simpler and more cost effective than a fully automatic system in which one or more actuators are provided to move the shroud.

A biasing means may be provided which biases the head of the pin towards the clamped position. This may comprise a leaf or coil spring which may act between a stop provided on the pin and a portion of the bracket.

The assembly may be provided with actuator control means for receiving one or more signals from sensors which detect the operation of the vehicle to which the assembly is fitted and in response to a signal indicating an abnormal deceleration the control means may be operable to move the clamping mechanism from the locked position to a collapse position in which the clamping mechanism is at least partially released to permit controlled collapse of the steering column shroud and hence steering column. This actuator control means may also receive the signal from the user operated switch.

In one especially advantageous arrangement, the steering column assembly may comprise an electrically power assisted steering (EPAS) system in which a motor is provided that is connected to the steering shaft to provide an assistance torque. A control signal is fed to the motor from a suitable controller, typically including a microprocessor. The microprocessor for the EPAS motor and the actuator of the clamping mechanism may advantageously combined in a single unit. This may then receive signals from sensors around a body of a vehicle to which it is fitted such as accelerometers.

In the locked position the assembly may completely prevent the collapse of the assembly (other than by forcibly breaking parts of the assembly). In the unlocked position the force required to manually adjust the assembly may be minimum. This is achieved by positioning the head of the pin such that the biasing means applies little or no biasing force. In the collapse position a controlled resistance to collapse may be provided by the clamping mechanism.

The collapse position could correspond to the unlocked position of the clamp assembly although it is preferred that it is a unique position which is different from the locked and unlocked position. Where a clamping pin is provided it may lie somewhere between the locked and unlocked position.

The signals received by the actuator control means, which may comprise a microprocessor, could be signals indicating the firing of an airbag fitted to the steering wheel or perhaps a signal indicating an unusually high deceleration of the vehicle. This would indicate the onset of an accident and would pre-empt the triggering of an airbag if one is fitted. Another suitable signal would be an ignition switched feed or speed dependent signal which the actuator controller could use to ensure that the user operated switch is inactive when the ignition is switched on. This could prevent the steering being accidentally released when the vehicle is being driven.

Where the clamping mechanism includes a pin and a biasing means that biases the head of the pin towards the locked position, the collapse position may be such that the head is moved away from the locked position towards the unlocked position by the actuator until a point is reached in which the biasing means applies a predetermined force to oppose collapse. The force will depend on the displacement/force characteristics of the biasing means, the physical nature of the engagement surfaces between the guide post and the head/toothed member and the distance that the pin head is moved away from the fully clamped position.

Where the engagement between the surfaces is by way of complimentary teeth, the application of a collapse load to the steering assembly will cause the teeth to "chatter" or ride over one another as the column collapses, the chattering being opposed by the force provided by the biasing means.

The actuator control means may vary the position of the clamping pin in the collapse position over a predetermined period of time to provide a controlled collapse. This can be easily achieved by operation of the actuator to move the pin in a known manner following the receipt of a signal which triggers movement to the collapse position. The biassing means may be arranged such that the further the pin is moved towards the fully unlocked position over time the less the force provided by the biasing means, reducing the amount of resistance against collapse of the assembly.

Upon detection of a collapse, the actuator control means may operate the actuator to rapidly release the clamp to an initial collapse position and subsequently to gradually unclamp the clamping mechanism over time providing a decreasing resistance to collapse. After a short period equal to the time for an airbag to inflate it may then hold the pin in a fixed position to maintain a constant force resisting collapse. After a further short period corresponding to the onset of deflation of the airbag the pin may be further released to reduce the force opposing collapse to an even lower level. The duration of each stage and the position of the clamp mechanism may be accurately controlled by the actuator control means.

The actuator control means may comprise a microprocessor and a set of instructions stand in an EEPROM associated with the microprocessor. It has been appreciated that the provision of teeth which can ride over one another on collapse could in extreme cases lead to wear of the teeth. In an alternative arrangement, therefore, the contact between the two surfaces may be provided by a simple frictional engagement. One or both surfaces may be provided with a section of friction lining of high coefficient of friction. A collapse force applied to the steering column will cause the surfaces to ride over one another and provide a resistance to collapse which will depend on the coefficient of friction of the two surfaces and the biasing force pressing the surfaces together applied by the biasing means.

The friction surface may be applied to a substantial portion of a circumference of the steering column and a corresponding hooked portion of the guide post which embraces the steering shaft in the region of the friction lining, the hooked portion being drawn into engagement with the steering shaft by the clamping pin when the clamping mechanism is in the locked position.

Other advantages of this invention will become apparent to those skilled in the art from the following detailed description of the preferred embodiment, when read in light of the accompanying drawings.

DETAILED DESCRIPTION OF THE INVENTION

Figure 1:
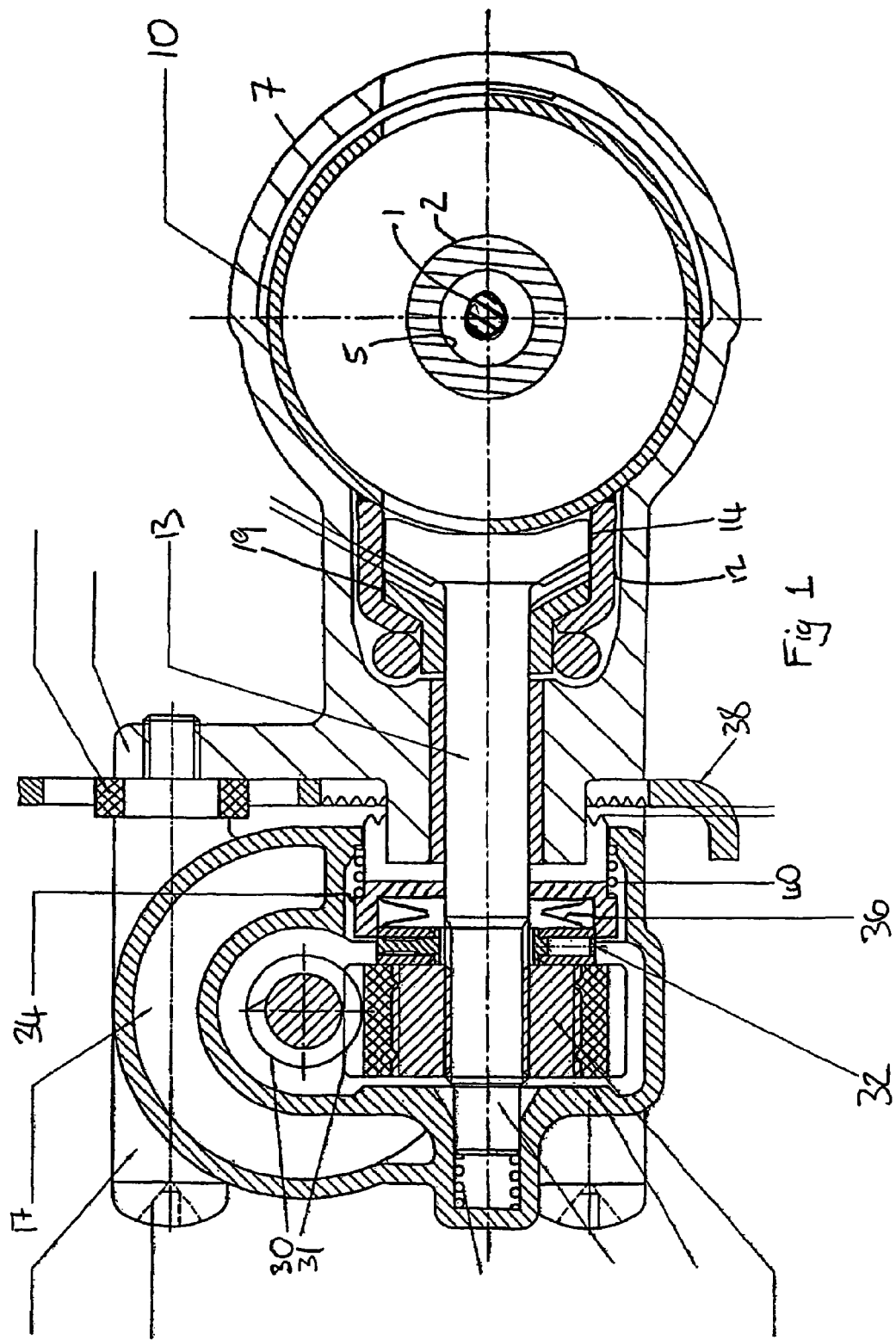
FIG. 1 shows a cross section perpendicular to the steering column, viewed in the direction away from the steering wheel through a steering column according to a first aspect of the invention.

A steering column assembly for a vehicle, according to a first aspect of the invention is shown in FIG. 1 of the accompanying drawings. It comprises a two part steering shaft 1,2. The first lower, part 1 is connected to an EPAS motor (not shown) at its lower end which outputs a torque through an output shaft to the lower part 1. The second, upper, part 2 is secured at its upper end to a steering wheel (not shown). The second part 2 of the steering shaft has an internal bore 5, which slidingly accommodates an upper end of the lower part 1. Splines on the two parts prevent them from rotating relative to one another.

The EPAS motor is located within a cast metal housing (not shown). An elongate guide portion 7 is secured to this housing and defines a lower shroud for the steering shaft 1, 2. As such, the shaft 1, 2 extends through the centre of the guide portion 7 for rotation therewithin. The guide portion 7 extends away along the steering shaft 1, 2 from the motor housing past the point where the two parts 1, 2 inter-engage but stops short of the upper end of the upper part. The remainder of the steering shaft 1, 2 is covered by a hollow tubular upper shroud 10 which is slidingly engaged within the guide portion 7 around the steering shaft 1, 2.

A groove is cast in the inside wall of the guide portion 7. This is sized to accept a locking rail 12 welded to upper shroud 10. The locking rail 12 may slide within the groove but does not permit rotation of the upper shroud 10. This allows the assembly to resist torsional forces such as those exerted by a thief attempting to break a steering lock associated with the assembly.

The slidable engagement of upper shroud 10 and guide portion 7 allows adjustment of the reach or axial length of the combined shaft 1, 2. In this embodiment the rake or angle of the shaft in the vertical plane is adjustable by means of the EPAS motor and hence guide portion 7 being pivotally connected to the body of the vehicle at the lower end of the shaft 1, 2. Of course, it is necessary to hold the assembly in place. This is performed using the following clamping mechanism.

A pin 13 passes through locking rail 12 and guide portion 7. The pin 13 has a head 14 in the space between locking rail 12 and upper shroud 10. Locking rail 12 correspondingly has an elongate opening which allows the upper shroud 10 to move along its axis relative to the pin 13. The head of the pin 13 is formed with teeth on one side thereof which are complementary to and face similar teeth formed on a toothed member 19 on the outer side (that is further from the shaft 1, 2) of the space between locking rail 12 and upper shroud. Accordingly, if the pin 13 is forced outwards the two sets of teeth mesh and the outer shroud is forced against the arcuate side wall of the guide portion 7. This frictional engagement prevents movement of the upper shroud 10 relative to the guide portion.

In order to prevent angular movement of the guide portion 7 and hence shaft 1, 2 relative to the vehicle a clamp block 34 is provided slidably mounted on the pin 13. This has a serrated face facing the guide portion 7. A mounting bracket 38 fixed to the vehicle is positioned such that the guide portion 7 can slide along it with an elongate slot in the mounting bracket 38 allowing passage of the pin 13. The area of the mounting bracket 38 surrounding the slot is provided with complementary serrations to the clamp block 34. Thus, if the clamp block is urged into contact with the mounting bracket 34 the pin 13 will immobilise the guide portion relative to the mounting bracket 38 and hence fix the rake adjustment.

In order to supply the outward force on the pin 13 and to urge the clamp block 34 against the mounting bracket 38—two forces acting in opposite directions—an electric motor 17 is used. This is situated such that its output shaft 30 rotates about an axis perpendicular to the pin. A clamp nut 31 is mounted on the pin 13 at the end distal to the shaft 30,31. The clamp nut 31 is formed on its outside with a gearing which meshes with a gearing of the output shaft 30 such that the motor drives rotation of the clamp nut 31 about the pin 13. The inside of the clamp nut 31 and the area of the pin 13 about which the nut 31 is situated are formed with complementary threads.

The threads are such that rotation of the clamp nut 31 by the motor 17 drives the clamp nut laterally relative to the pin. This in turn has the effect that the pin is forced in one direction and the clamp nut in the other.

In the case where the pin 13 is forced outwards and the clamp nut 31 towards the shaft 1, 2, the former action will lock the upper shroud 10 to the guide portion 7 as described above. Movement of the clamp nut 31 towards the shaft 1, 2 urges clamp block 34 into contact with mounting bracket 38 through thrust bearings 32 and a compression spring 36. This locks the rake adjustment as also described above.

Driving the clamp nut 31 in the opposite sense has the effect of unlocking each adjustment. As the clamp nut travels along the pin 13 the spring 36 gradually relaxes and as such reduces the force holding pin head 14 and toothed member 19 together. Once the spring 36 has released to a certain extent the force of return spring 40 will force the clamp block 34 out of contact with the mounting bracket, fully releasing both degrees of freedom.

One particular aspect of this embodiment is that the gradual release of the pin head 14 and toothed member 19 contact can be used to control the resistance to collapse of the steering column. As the motor gradually releases the contact a point will be reached where, if a sufficient force is exerted on the shaft 1, 2 then the teeth of the pin will ride over those of the toothed member 19; the teeth are said to "chatter". The amount of chatter can be controlled by the amount the motor 17 winds the clamp nut 31.

Figure 2:
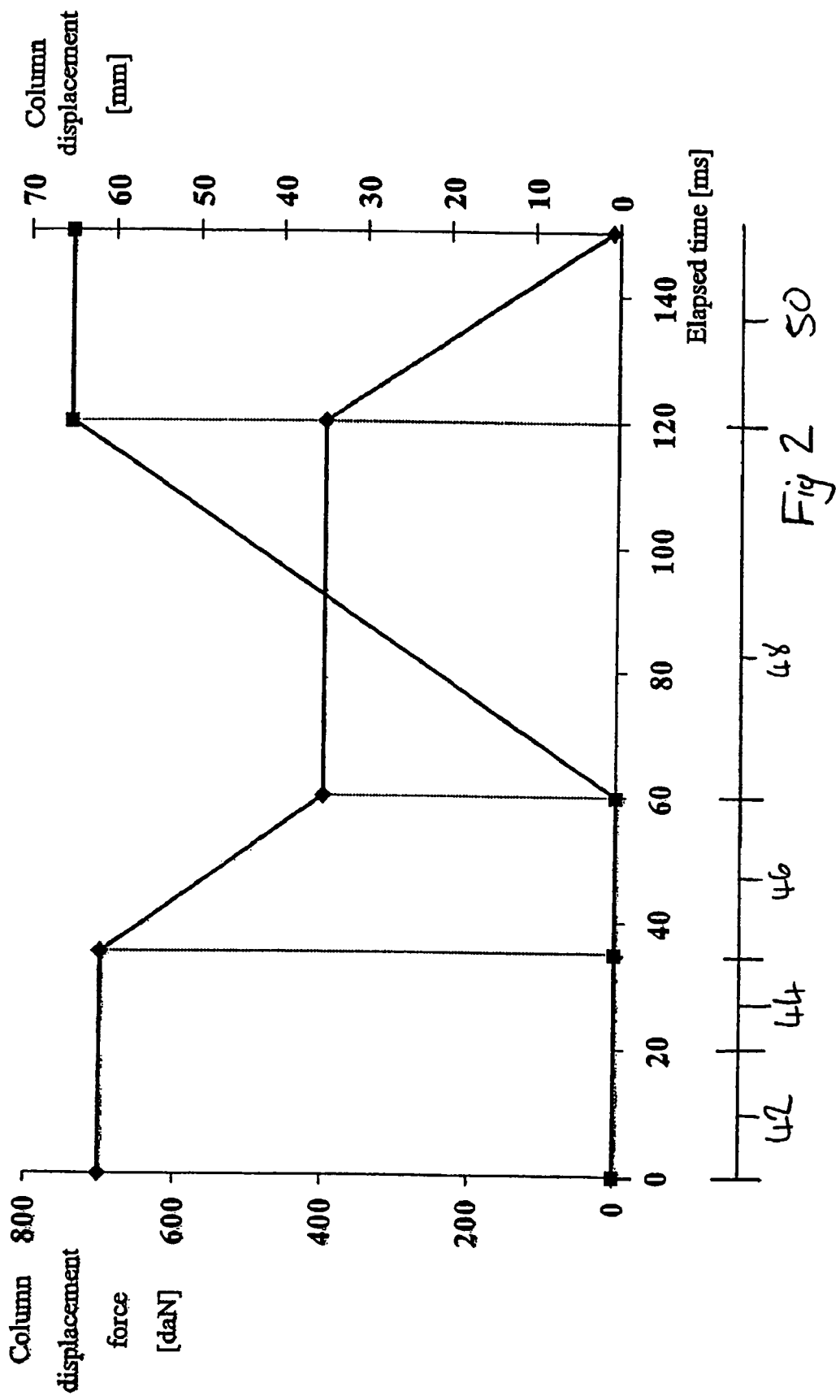
FIG. 2 shows a graph of column displacement and column displacement force during a crash.

This is particularly useful in crash situations, when it is desirable for steering columns to collapse in a predictable way in the event of being impacted by the driver. A graph showing the desired response of the column to an impact is shown in FIG. 2 of the accompanying drawings. The trace shown with diamonds shows the column displacement force (i.e. the minimum force necessary to force the teeth to chatter and hence allow the column to collapse, shown on the left hand scale) whilst the trace shown with squares shows the displacement of the column (right hand scale).

The crash occurs at time t=0s. A deceleration sensor of the vehicle detects this but takes a period 42 (up to approximately t=20 ms) to do so and signal the appropriate devices. Once it has done this, an airbag associated with the steering assembly is ignited and the motor 17 signalled to partially release the lock on column reach. During the next period 44 (from approximately t=20 ms to t=35 ms) the airbag fills but the motor has yet to start releasing the lock due to the inherent freeplay etc. in the motor. The motor starts releasing the reach adjustment at t=35 ms and so for the period 46 up to t=60 ms the column displacement force reduces. Throughout the period 44 and 46 the airbag fills.

The motor then, at t=60 ms, stops releasing the reach adjustment. This allows energy to be dissipated in the column by collapse of the column against the column displacement force and that of the airbag, now inflated. This continues through period 48 until t=120 ms. By the end of this period, the column has travelled almost to the limit of its travel and the airbag is at the point of collapse. Accordingly in the final period 50 the motor is driven to completely release the reach adjustment and the airbag deflates.

Figure 3:
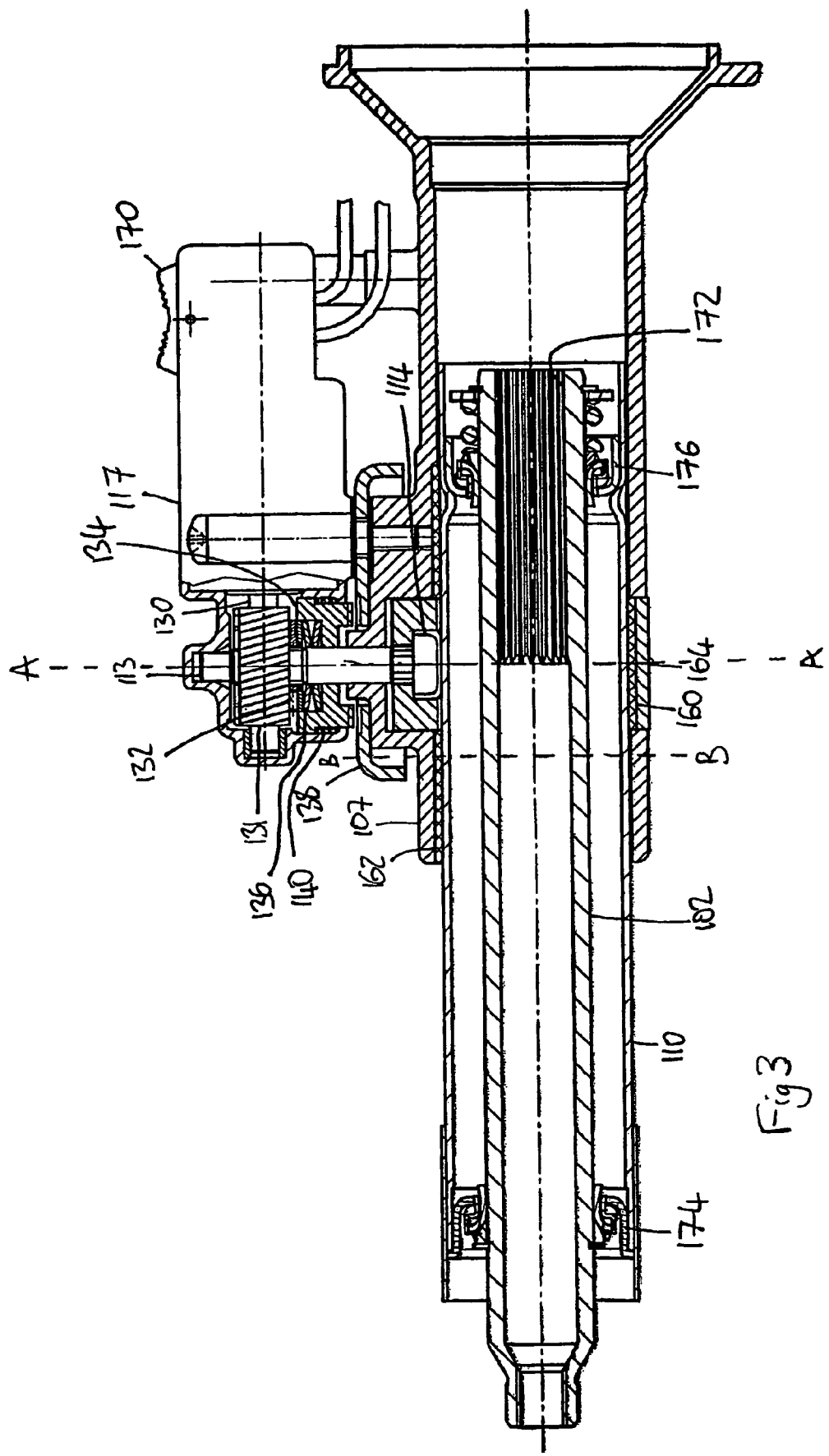
FIG. 3 shows a cross section through a steering column assembly according to a second embodiment of the invention.
Figure 4:
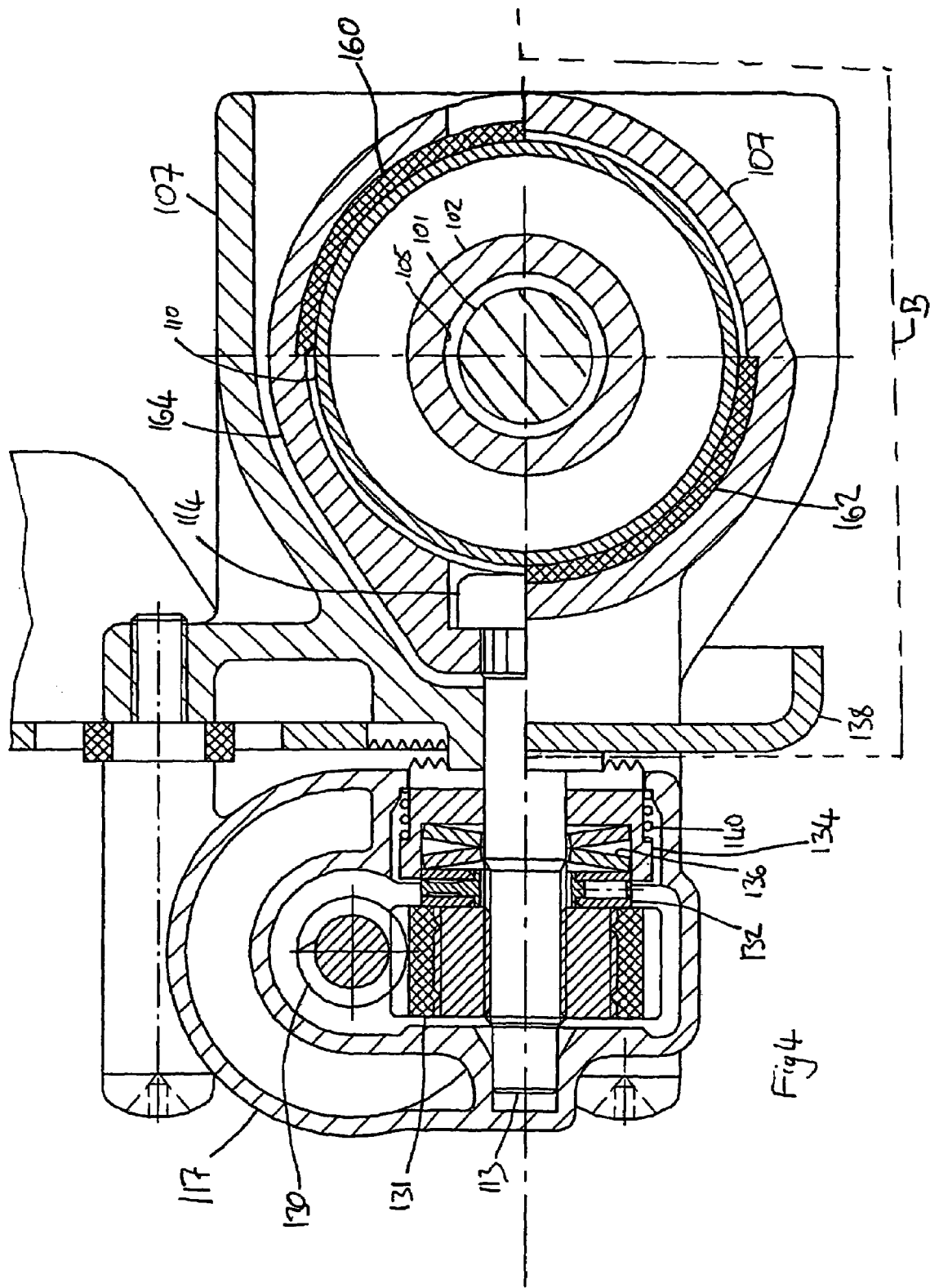
FIG. 4 shows a cross section along line A-A of FIG. 3 except for box B which is along line B-B of FIG. 3.

A second embodiment of a steering assembly according to the present invention is shown in FIGS. 3 and 4 of the accompanying drawings. Similar features to those of the preceding embodiments have been given the same indicia incremented by 100.

The steering assembly of this embodiment is broadly similar to that of the preceding embodiment. In FIG. 4 of the accompanying drawings the lower shaft 101 has not been shown in order to show the splined reception 172 for the lower shaft 101 in the upper shaft 102. The figure also shows how the upper shroud 110 supports the upper shaft 102; upper 174 and lower 176 roller bearings support the upper shaft 102 towards the upper and lower ends of the upper shroud 110. A control switch 170 on motor 117 can also be seen. This instructs the motor to drive to unlock or lock the rake and reach adjustments at a driver's request. These features are equally applicable to the first embodiment.

The second embodiment differs in the mechanism by which the reach adjustment is locked. The method of locking the rake adjustment using a clamp block 134 onto a serrated mounting bracket 138 is the same as for the previous embodiment. The pin 113 lacks the toothed head 14 of that embodiment but instead has a relatively flat head 114 which engages a carrier 164. Carrier 164 encircles the upper shroud 110 within the guide portion 107 in the region adjacent to the pinhead 114 and extends part way along the upper shroud 110 in either direction. The inner surface of the carrier 164 at the far side of the carrier from its engagement with the pin 113 is coated with a friction lining 160 such as is commonly used in motorcycle brakes. The opposite inner surface of the guide portion 107 in the region of the guide portion either side of the carrier 164 is provided with a similar friction lining 162.

Accordingly, when the pin 113 is driven by the motor 117 outwards away from the shaft 101,102 the carrier 164 pulls the upper shroud onto the interior surface of the guide portion. The friction linings 162,164 prevent relative movement of guide portion 107 and upper shroud 110 thereby locking the reach adjustment. Driving the motor 117 in the opposite direction will release the clamping force and allow reach adjustment.

In the event of a crash, a similar procedure to that of the first embodiment can be followed. A small movement of the movement driving the pin 113 slightly towards the shaft 101, 102 but not enough to completely unclamp will allow the upper shroud 110 to be driven relative to the guide portion 107 against the frictional forces due to the friction lining 162,164. The amount of frictional force can be varied by how much the pin 113 is released. A release profile similar to that of FIG. 2 of the accompanying drawings can then be employed.

Use of the friction linings 162,164 allows collapse of the column multiple times. The toothed engagement of pin head 14 and toothed member 19 of the first member is such that, if the teeth are allowed to "chatter" they will quickly wear away. The friction linings 162,164 are more suited to multiple use of the collapse feature.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A steering column assembly comprising a steering column shroud which supports a steering column shaft, said shroud being connected to said vehicle by a clamping mechanism which is operable between a locked position in which said shroud is clamped in position relative to a fixed position of said vehicle chassis and an unlocked position in which said shroud is adjustable for reach and/or rake relative to said vehicle chassis, said clamping mechanism including an actuator being adapted to move said clamp between said locked position and said unlocked position, said assembly being further provided with actuator control means for receiving at least one signal from a sensor which detects an operation of said vehicle to which said assembly is fitted and in response to a signal indicating an abnormal deceleration said control means is operable to move a clamping mechanism from a locked position to a collapse position in which said clamping mechanism is at least partially released to permit controlled collapse of a steering column shroud and hence said steering column, wherein, upon detection of collapse, said actuator control means operates said actuator to rapidly release said clamp to an initial collapse position and subsequently to gradually unclamp said clamp over time providing a decreasing resistance to collapse.

2. A steering column assembly according to claim 1 including a user operated switch, which is connected to said actuator and which is operable to control an operation of said actuator to move said clamp between said locked position and said unlocked position.

3. A steering column assembly according to claim 2 wherein said user operated switch comprises a one touch switch, operable by a user between a locked and an unlocked position corresponding to said locked position and said unlocked position of said clamping mechanism respectively.

4. A steering column assembly according to claim 3 wherein said actuator comprises an electric motor.

5. A steering column assembly according to claim 4 wherein on operation of said switch from said locked position to said unlocked position, a drive current is applied to said motor to drive it in a first direction to move said clamp to said unlocked position and on operation of said switch from said unlocked to said locked position a drive current is applied to said motor so that it is driven in a second, opposite direction to move said clamp to said unlocked position.

6. A steering column assembly according to claim 1 wherein adjustment of said steering column is made by manual adjustment.

7. A steering column assembly according to claim 1 wherein said actuator drives at least one gear.

8. A steering column assembly according to claim 1 wherein said actuator rotates a cam relative to a cam follower.

9. A steering column assembly according to claim 1 wherein a manual override is provided which permits said mechanism to be locked or unlocked in the event of a malfunction.

10. A steering column assembly according to claim 1 wherein said clamp comprises a pin which carries a clamping head assembly, said pin being connected to said actuator through at least one gear and which can be driven axially upon operation of said actuator, said pin passing through an opening in a bracket fixed to said vehicle and an opening in said shroud with said head being on an opposite side of said shroud to said bracket such that operation of said actuator to said locked position draws said clamping head assembly towards said shroud and clamps said shroud to said bracket.

11. A steering column assembly according to claim 10 wherein said opening in said fixed portion, comprises an elongate slot which is parallel to an axis of said steering shaft and orthogonal to an axis of said pin to allow said pin to move in said slot for adjustment of said shroud for reach.

12. A steering column assembly according to claim 10 wherein said opening in said fixed portion or bracket comprises an elongate slot which is orthogonal to an axis of said steering shaft and an axis of said pin to permit adjustment of said shroud for rake.

13. A steering column assembly according to claim 10 wherein said head of said pin is provided with at least one track of teeth, which engage corresponding teeth on said guide post when in said locked position.

14. A steering column assembly according to claim 10 wherein a toothed member is provided between said head and said guide post which has at least one track of teeth that engage corresponding sets of teeth on said shroud.

15. A steering column assembly according to claim 1 wherein said signal received by said actuator control means is a signal indicating an unusually high deceleration of said vehicle.

16. A steering column assembly according to claim 1 wherein engagement between two surfaces of said clamping mechanism is by way of complimentary teeth, an application of a collapse load to said steering assembly causing said teeth to ride over one another as said column collapses, said ride over being opposed by a force provided by a biasing means.

17. A steering column assembly according to claim 1 wherein engagement between two surfaces of said clamping mechanism is by frictional engagement, at least one surface being provided with a section of friction lining of high coefficient of friction.

* * * * *

UNITED STATES PATENT AND TRADEMARK OFFICE
CERTIFICATE OF CORRECTION

PATENT NO.        : 7,406,894 B2                                            Page 1 of 1
APPLICATION NO. : 11/241731
DATED             : August 5, 2008
INVENTOR(S)       : Eckart Op Den Camp It is certified that error appears in the above-identified patent and that said Letters Patent is hereby corrected as shown below:

On the title page of the patent, please insert the following:

Related U.S. Application Data
(63)    Continuation of application No. PCT/IB04/01263, filed on Mar. 19, 2004.

(30)           Foreign Application Priority Data
  Apr. 1, 2003   (GB)   ................................   0307468.9

Signed and Sealed this

Thirtieth Day of September, 2008

JON W. DUDAS
*Director of the United States Patent and Trademark Office*